March 2, 1965 J. W. DIEFFENDERFER 3,171,974

TUNNEL DIODE LATCHING CIRCUIT

Filed March 31, 1961

INVENTOR
JAMES W. DIEFFENDERFER
BY George J. Netter
ATTORNEY

United States Patent Office
3,171,974
Patented Mar. 2, 1965

3,171,974
TUNNEL DIODE LATCHING CIRCUIT

James W. Dieffenderfer, Owego, N.Y., assignor to International Business Machines Corporation, New York, N.Y., a corporation of New York Filed Mar. 31, 1961, Ser. No. 99,749
4 Claims. (Cl. 307—88.5)

The present invention relates to a special circuit capable of being set to any one of a plurality of different stable electrical conditions.

In a number of different types of electric signal translating equipment, a standard functional component is a device which can be set, either by voltage or current, to different states of equilibrium, each one of which states is distinct from the other. Such devices or functional components are conventionally termed latches.

Since apparatus of this general type frequently utilizes building-block devices of the latching type in relatively large quantities, there is an ever increasing attempt to obtain new devices of this kind that are of a simpler and less expensive construction while maintaining a high degree of reliability.

Additionally, incorporating latching devices into operative relation with other electronic circuitry makes it desirable, in many cases, that the outputs of such devices be in current level form rather than voltage level output. Thus, in a large number of circuits used as basic functioning units in computers and other such signal translating equipment, operation is initiated by pulses or current inputs and if latch type devices having voltage level outputs are to be used in the initiating apparatus, a suitable voltage-current or voltage-pulse conversion means is needed. This requirement, of course, is reflected in increased cost and weight, both of which are obviously undesirable.

It is, therefore, an object of the invention to provide a circuit capable of being set to any one of a number of discrete states of electrical equilibrium and which will remain in a set condition until affirmatively set to another of its possible states.

A further object of the invention is to provide such a latching circuit having a current output reflecting the particular state to which it is set.

Another object of the invention is to provide a latching means wherein an active element is a solid state semiconductor having a plurality of discrete electrical resistance states.

Briefly, the novel latching circuit of the invention comprises a bridge-type arrangement of fixed value resistances with one or more special active elements which are capable of being set to either of two possible states of electrical resistance. The relative values of these various resistances are such that when the active element(s) is in one of its states, the current in a selected branch is substantially zero while that in another selected branch has a significant magnitude. Changing to the other resistance state of the active element reduces the magnitude of the current in the second branch substantially to zero and simultaneously provides a significant current in the first branch. Appropriately sensing the presence or absence of currents in the two branches provides an indication of the state in which the circuit exists and thus its coded representation.

The foregoing and other objects, features and advantages of the invention will be apparent from the following more particular description of preferred embodiments of the invention, as illustrated in the accompanying drawings.

Figure 1:
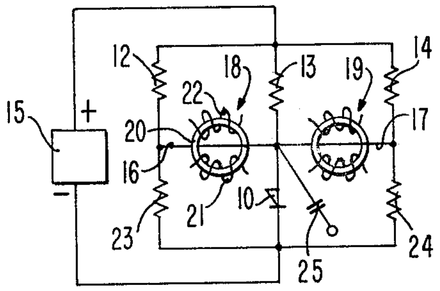
FIG. 1 is one circuit arrangement for practicing the invention.
Figure 2:
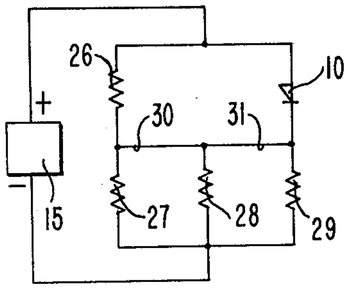
FIGS. 2 and 3 are alternate schematic representations for practicing the invention.
Figure 3:
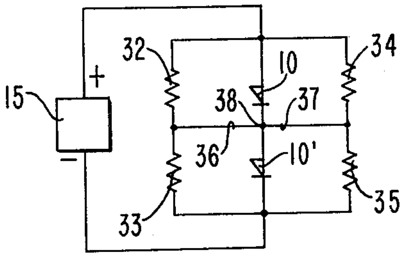

In each of the circuit arrangements of FIGS. 1–3, one or more special active elements 10 and 10' are incorporated as a basic common parameter. Since the operation of this element is fundamental to the practice of the invention, its general properties and characteristics will be discussed at this time.

The special active element is a diode of the semiconducting type, which in operation exhibits a phenomenon known as "tunneling." It is not necessary for present purposes to understand this phenomenon fully; however, those features having specific pertinence to the operation of the invention will be set forth at this time.

Figure 4:
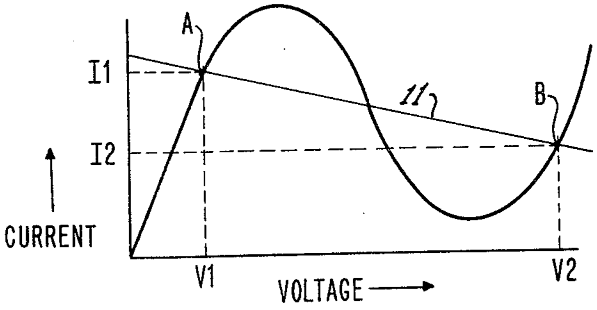
FIG. 4 is an illustrative current-voltage graph of the special active element used in the circuits of FIGS. 1–3.

Thus, in FIG. 4, a straight line 11 of negative slope illustrates a given load line having two important intercepts with the characteristic curve indicated as A and B. The point A has coordinates $I_1$ and $V_1$ defining a corresponding resistance of the element at this loading approximately equal to the ratio $V_1/I_1$ and which will be referred to here as RL. The point B with coordinates $I_2$, $V_2$ has a corresponding associate resistance RH. It is clear that RH has a significantly greater magnitude than RL and, as will be brought out below, this feature is of prime importance in the operation of the novel circuits described herein.

When the special diode is biased to, say, the A condition, it has the capability of maintaining approximately the same set of characteristics associated with the chosen state, i.e., resistance value RL, until it is affirmatively set or switched to the other state. This is true as long as the point A is not moved over the crest of the curve toward the valley in which case, due to the tunneling effect noted above, the operating point proceeds further down the slope of the curve through the valley to some point on the rise, such as B.

Similarly, operation of the diode at the point B is a stable one and will be sustained unless the diode is so biased as to carry the operating point back over the crest onto the front side of the curve re-establishing the A condition. In other words, the special diode is characterized by a relatively large region of operating instability, extending toward the right from approximately the crest to some point just beyond the valley of the curve, that separates two relatively stable operating regions. It is this capability of the elements 10, 10' to reside stably in either of two discrete states of electrical resistance upon which the present invention is fundamentally dependent.

A more complete discussion of the properties and nature of diodes of this special type can be found in the article by L. Esaki entitled "New Phenomenon in Narrow Germanium P–N Junction" in the Physical Review, volume 109, pages 603–604, January 15, 1958.

Referring now particularly to FIG. 1, there is shown a circuit for providing two stable states of electrical equilibrium and indicating the particular condition in which the circuit resides and constructed in accordance with the principles of the invention. As to details, three resistances 12, 13 and 14 have one end of each connected in common and to the plus terminal of a D.C. bias voltage supply 15. Between the free ends of resistances 12 and 13 there is provided a first sensing connector 16 and, similarly, a second sensing connector 17 is provided between the free ends of the resistances 13 and 14.

Arranged in respective surrounding relationship to the sensing connectors 16 and 17 are sensing toroids 18 and 19. The toroids individually comprise a toroidal shaped base 20 composed of a material having a high magnetic permeability and provided with an energization winding 21 and a sensing winding 22. A more complete discussion of the operation of the sensing toroids will be set forth below.

The common end of the connector 16 and resistance 12 is connected to a resistance 23, and resistance 24 is connected from the common end of the connector 17 and the resistance 14 to the free end of resistance 23. The diode 10 has its anode connected to the common point of the connectors 16 and 17 and the resistance 13, and its cathode to the common point of resistances 23 and 24 with its forward direction thus in conformity with current provided by the supply 15. The common point of resistances 23 and 24 and the element 10 is connected to the negative terminal of the voltage supply 15.

Setting the diode 10 to its different possible states of equilibrium is accomplished by selectively directing a current pulse of suitable polarity and magnitude from an external generator (not shown) through a capacitance 25 to the anode of the diode. In explanation, assuming the diode to be biased to the B condition, as shown in FIG. 4, if a pulse of negative polarity is applied thrugh the capacitance 25, the diode is driven back along the curve over the critical crest and onto the front downslope of the curve. Accordingly, the diode would now have the electrical resistance associated with the point A, i.e., substantially equivalent to the ratio $V_I/I_1$. On the other hand, with the diode operating on this front slope of the curve, applying a positive pulse of magnitude sufficient to drive the operating point over the critical crest, and thus into the area of instability, would cause the diode to arrive at a stable point of operation in the B region.

The values of the different fixed resistances are such, relative to the diode resistances, that when the diode is in one of its resistance states, a current will be produced in one of the sensing connectors and simultaneously substantially zero current will exist in the other sensing connector and switching the diode to its other state causes the current conditions in the two sensing connectors to reverse. For the two required current conditions to exist and be mutually exclusive, the following mathematical relationships must hold:

$$I_{16}=0 \qquad I_{17}=0$$

$$\frac{R_{12}}{R_{23}}=\frac{R_{13}||R_{14}}{RL||R_{24}} \qquad \frac{R_{14}}{R_{24}}=\frac{R_{12}||R_{13}}{RH||R_{23}}$$

The symbol || indicating electrical parallel relationship is used for convenience and ease of presentation.

It is implicit from the above equations that a particular load line is selected prior to determination of the values of the fixed resistances. Also, it is necessary that the chosen load line intersect the characteristic curve at points located to stable operating regions, otherwise corresponding states of equilibrium of the circuit cannot be obtained.

In operation, the active element 10 is first affirmatively pursed to one of its possible states. Thus, if it is set to operate in the A region, the element 10 has the resistance denoted above as RL and from the equations, current $I_{16}$ will be very small or substantially zero (0), while $I_{17}$ will be a significant measurable amount thereby in effect coding the two halves of the circuit to different binary states. Pulsing the diode to the B state increases $I_{16}$ to a significant value and simultaneously brings $I_{17}$ substantially to zero thereby changing the representative binary states of the circuit halves from the first-described condition.

Although there are a number of different ways of detecting the presence or absence of electric current flow in the connectors 16 and 17 and thus determination of the binary condition of the latch circuit, the use of sensing toroids offers advantages of simplicity of construction, ruggedness and relatively low cost. In essence, each of the toroids 18 and 19 is a transformer in which the energization winding 21 is a "primary" and the sensing winding is a "secondary." A pulselike voltage is applied to the primary from a suitable source of the supply (not shown) and the magnitude of the secondary voltage will be one value when the current in the corresponding branch is substantially zero and a smaller value when a significant current is flowing in the branch. A greater difference in these two secondary voltages is obtained when the D.C. current through the appropriate connector produces a field in the core base 20, i.e., in bucking relation to the field induced by the pulse current in the primary. Whichever method is used, the output of the sensing winding 22 is provided in two discrete levels, each indicative of only one of the two possible binary conditions for the particular sensing connector.

An alternate circuit arrangement further exemplifying the principles of the invention is that shown in FIG. 2. Here, a resistance 26 has one lead connected in common with the anode of the special element 10 to the positive terminal of the voltage supply source 14. Three resistances 27, 28 and 29 are provided with one lead of each connected in common and to the negative terminal of the supply source. The free end of resistance 27 is connected to the free end of resistance 26 and the free end of resistance 29 is connected to the cathode of the element 10. Interconnecting the common point of resistances 26 and 27 and the free end of resistance 28 is a first sensing connector 30, the purpose and function of which are identical to that of the connector 16. A second sensing connector 31 operatively relates the junction of the sensing connector 30 and resistance 28 to the common point of the cathode of element 10 and resistance 29.

Similarly as brought out above in regard to the first embodiment, the values of the different resistances are such that two, and only two, relative current conditions are obtained in the sensing connectors 30 and 31 on setting the active element 10 to its different stable resistance states. Mathematically, the required parameter values are as follows:

$$I_{30}=0 \qquad I_{31}=0$$

$$\frac{R_{26}}{R_{27}}=\frac{RL}{R_{28}||R_{29}} \qquad \frac{RH}{R_{29}}=\frac{R_{26}}{R_{27}||R_{28}}$$

In the present embodiment, as well as that of FIG. 3, the toroidal sensing transformers and means for setting the active element to its different states are not shown since they are identical in structure and function.

The circuit of FIG. 3 is an embodiment of the invention that offers an especially stable performance with respect to both switching condition and steady-state operation. The circuit is comprised of a pair of active elements 10 and 10′ arranged in series relation to one another (cathode-to-anode) and connected to the bias voltage supply 15 so that bias current passes forwardly through both elements. A first resistance network composed of resistances 32 and 33 in series is shunted across the two elements 10 and 10′. Similarly, a second series network of resistances 34 and 35 is connected in shunting relation to the active elements and thus also to the resistances 32 and 33. A first sensing connector 36 is provided interconnecting the common point of the active elements and the common point of resistances 32 and 33, and a second sensing connector 37 similarly interconnects the common of the active elements and the common of the resistances 34 and 35.

For convenience, the sensing toroids and setting means are not shown here since the function and operation of both are identical to the corresponding items described above in relation to the first embodiment. It is important to note, however, that setting pulses are applied to the common point of the two diodes indicated at 38.

Because of the cathode-anode connection of the elements 10 and 10′, a given setting pulse applied to 38 sets the two elements to opposite resistance. Thus, if a negative pulse is applied to the setting terminal 38, the element 10′ is set to the low resistance state (RL) and the element 10 is set to the high resistance state (RH). The converse is true when a positive pulse is applied to the terminal.

Although the fundamental theory of operation discussed above in regard to the first embodiment of the invention is essentially the same for each of the embodiments, the switching action obtained here is of a more positive nature due primarily to the fact that the two elements during a switching operation move in opposite directions, i.e., one moves from high resistance to low and the other from low to high. Also, since the summation impedance of the elements 10 and 10′ in either set condition of the circuit is the same, a constant impedance is seen by the power supply 15 thereby making regulation of the power supply a relatively easy matter from a technical standpoint.

It is also of interest that all of the changes in currents provided by switching the resistance states of the elements 10 and 10′ take place in the sensing connectors 36 and 37 which is indicative of the high degree of operational efficiency possessed by the present circuit.

A more complete understanding of the advantages of the circuit of FIG. 4 can be obtained by reference to the following equations identifying the relationship of the different fixed resistances to the resistance states of the elements for the two required current conditions:

$$I_{36}=0 \qquad\qquad I_{37}=0$$

$$\frac{R_{32}}{R_{33}}=\frac{RH\|R_{34}}{RL'\|R_{35}} \qquad \frac{R_{34}}{R_{35}}=\frac{R_{32}\|RL}{R_{33}\|RH'}$$

Although, in setting forth the features of the circuit of FIG. 4, it has been assumed that the elements 10 and 10′ have substantially identical operating characteristics, it is considered within the contemplation of the invention to utilize elements of this same general type having different electrical characteristics in the illustrated circuit arrangement.

While the invention has been particularly shown and described with reference to preferred embodiments thereof, it will be understood by those skilled in the art that various changes in form and details may be made therein without departing from the spirit and scope of the invention.

What is claimed is:

1. A two-state latching logic circuit providing an electric signal representation of the particular state in which the circuit exists, comprising:

a bias voltage source;

tunneling means which can be electrically stimulated to exhibit either of two distinct ranges of electrical resistance;

a plurality of electrical resistances interconnected with said tunneling means to form a circuit network and fed by said voltage source, the relative values of the resistances and resistance ranges of said tunneling means being such that when the means is in one of its ranges a first selected branch current of the network is greater than that of a second selected branch, and when said means is in the other of its resistance ranges the second branch current is greater than the first branch current;

selectively actuable electric stimulating means operatively associated with said tunneling means and network for selectively setting said tunneling means to either of its two distinct ranges of electrical resistances; and means operatively related to the first and second branches of the network for detecting magnitudes of the currents in the branches of said network whereby the relative magnitudes of the currents in the two branches indicate in which of the two possible states the latching circuit resides.

2. A latching circuit as in claim 1, in which said network includes first and second resistances in series relation with said voltage source, a third resistance serially connected to said tunneling means, and the serial circuit shunted across the serially arranged first and second resistances, and fourth and fifth resistances serial to one another and shunted across the series arrangement of the third resistance and said tunneling means; and said first branch includes means connecting the common of the first and second resistances to the common of the third resistance and said tunneling means, and said second branch includes means interconnecting the common of the third resistance and said tunneling means and the common of the fourth and fifth resistances.

3. A latching circuit as in claim 1, in which said network includes first and second resistances serially connected to said voltage source; a third resistance connected in series with said tunneling means and the series combination shunted across said first and second serially connected resistances; a fourth resistance connected to the common point of the third resistance and the series circuit formed by said first and second resistances; and the first branch consisting of a first connecting means between the free end of the fourth resistance and the common of the first and second resistance and the second branch composed of a second connecting means between the common point of the tunneling means and the third resistance and the common point of the fourth and the first connecting means.

4. A latching circuit as in claim 1, in which said network includes first and second resistance in serial connection and fed by said voltage source; a pair of semiconducting devices serially connected and shunted across the series circuit composed of said first and second resistances; third and fourth resistances in serial connection shunted across said devices and said first and second resistances; first connecting means between the common point of said devices and the common point of said first and second resistances forming the first branch; and second connecting means between the common of said devices and the common of the third and fourth resistances forming the second branch.

References Cited by the Examiner

UNITED STATES PATENTS

| | | | |
|---|---|---|---|
| 2,581,273 | 1/52 | Miller | 307—88.5 |
| 2,944,164 | 7/60 | Odell et al. | 307—88.5 |
| 2,966,599 | 12/60 | Haas | 307—88.5 |
| 2,997,604 | 8/61 | Shockley | 307—88.5 |
| 3,019,981 | 2/62 | Lewin | 307—88.5 |
| 3,027,464 | 3/62 | Kosonocky | 307—88.5 |
| 3,053,998 | 9/62 | Chynoweth et al. | 307—88.5 |
| 3,054,912 | 9/62 | Strull et al. | 307—88.5 |
| 3,065,636 | 11/62 | Pfann | 307—88.5 X |

OTHER REFERENCES

Publication I: Digest to Technical Papers, 1960 International Solid-State Circuits Conference, Feb. 10–12, 1960, pages 6–11, 16, 17, 52, 53.

JOHN W. HUCKERT, *Primary Examiner.*

IRVIN SRAGOW, DAVID J. GALVIN, *Examiners.*